UNITED STATES PATENT OFFICE.

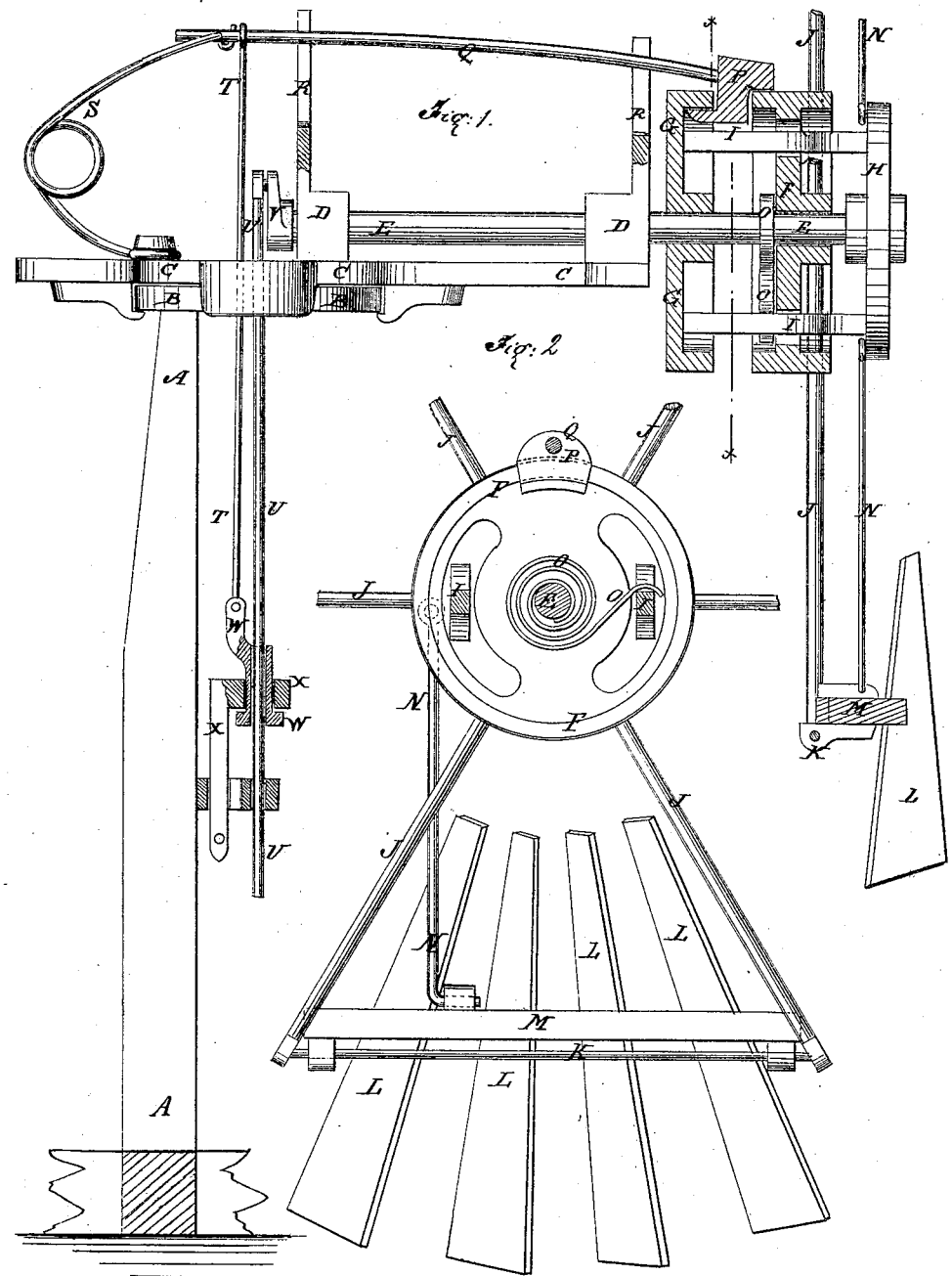

ISAAC LEHMER, OF LIMA, INDIANA.

IMPROVEMENT IN WINDMILLS.

Specification forming part of Letters Patent No. 132,297, dated October 15, 1872.

*To all whom it may concern:*

Be it known that I, ISAAC LEHMER, of Lima, in the county of La Grange and State of Indiana, have invented a new and useful Improvement in Windmills, of which the following is a specification:

Figure 1 is a side view of my improved windmill, partly in section, to show the construction. Fig. 2 is a detail sectional view of the same taken through the line $x\ x$, Fig. 1.

Similar letters of reference indicate corresponding parts.

My invention has for its object to furnish an improved windmill, which shall be simple in construction, reliable in operation, and more readily controlled than windmills constructed in the ordinary manner; and it consists in the construction and combination of various parts, as hereinafter more fully described.

A represents the tower or frame that supports the wind-wheel. To the top of the tower A is securely attached a ring or annular bed-plate, B, for the plate C that carries the wheel to revolve upon. The plate C is secured in place upon the annular plate B by lugs or brackets attached to the said plate C, and which overlaps the edges of the said plate B. To the plate C are attached the bearings D for the wheel-shaft E. To the outer part of the shaft E is rigidly attached a wheel or spider, F, which is made with a projecting flanged rim, and should also have a second rim or flange near its hub, which latter flange is not shown in the drawing. If desired, lugs may be used instead of the rims or flanges; but I prefer the flanges, as supporting the radial rods more firmly. G H are two wheels or spiders placed upon the shaft E, upon the opposite sides of the spider F, and which are connected by two or more bars or arms, I, which pass through short circular slots in the spider F, and the ends of which are connected firmly and rigidly to the spiders G H. J are radial rods which pass through the flanges or lugs of the spider F, so that their inner ends may rest against the hub of said wheel. To the outer ends of the radial rods J are attached, or upon them are formed, sockets to receive the rods K, to which the fans are hinged, and which should extend entirely around the wheel and thus serve as a tire to bind it together. L are the blades or wings of the fans, which are securely and rigidly attached to a bar, M, which is hinged to the rod K, and should be so arranged that the hinges should rest against the sockets upon the rods J to prevent the longitudinal movement of the bar M upon the rod K. To the bar M, toward the edge to which the wings L are attached, is pivoted the outer end of a rod, N, the inner end of which is connected with the outer spider H, so that a movement of the spider H in one or the other direction may turn the wings L to or from the wind, as may be desired. By this construction, as the wind increases in power the form of the wings L and the centrifugal force engendered by the revolution of the fans tend to turn the wings L into a horizontal position or from the wind, carrying the spiders G H in the opposite direction from that in which the central spider F is moving. As the motion decreases the spiders G H are drawn back, turning the wings L to the wind by the coiled spring O coiled around and attached to the shaft E, and the other end of which is connected with one of the arms or bars I, as shown in Figs. 1 and 2. The wind-wheel thus regulates itself to produce a uniform movement whatever may be the force of the wind or however it may vary. The motion of the spiders G H is retarded to allow the spider F to advance relatively, and thus throw the wings from the wind and stop the wheel by means of the brake P, which should be so formed as to bear first and with greater force upon the inner spider G. The brake P is attached to the end of a rod, Q, which passes through guides R attached to the plate C or bearings D, and with its inner end is connected a spring, S, by the elasticity of which spring S attached to the plate C the brake is applied. To the inner end of the rod Q is attached the upper end of the rod T, which passes down along the rod U, the upper end of which is pivoted to a short crank, V, attached to the inner end of the wheel-shaft E, and by which motion is given to the machinery to be driven. To the lower end of the rod T is attached a socket, W, through which the connecting-rod U passes, and in which it works up and down. To the lower part of the block W is swiveled the block X, to the downwardly-projecting arm of which is attached a rope, which extends down into such a position that the attendant can readily reach and operate it when he wishes to withdraw the brake and allow the wheel to revolve. The swivel W X allows the rod T to travel around the rod U as the plate C is turned upon the plate B by the shifting of the wind, while the lower part X of the said swivel remains stationary.

Having thus described my invention, I claim as new and desire to secure by Letters Patent—

1. The combination of the rigid spider F, two movable spiders, G H, arms I, rods J K N, hinged bars M, wings L, and spring O with each other and with the wheel-shaft E, substantially as herein shown and described, and for the purposes set forth.

2. The arrangement of a brake, P, or its equivalent, rod Q, and spring S, in connection with the spiders F G H and plate C, substantially as herein shown and described, and for the purpose set forth.

3. The swivel W X, constructed substantially as herein shown and described, in combination with the working-rod U and rod T for operating the brake, as and for the purposes set forth.

ISAAC LEHMER.

Witnesses:
   ELIAS P. KEIM,
   SAMUEL S. MAST.